: US005820420A

United States Patent [19]
Bechaz et al.

[11] Patent Number: 5,820,420
[45] Date of Patent: Oct. 13, 1998

[54] LINK CONNECTION ACCESSORY FOR A TERMINAL MODULE AND A MODULAR TERMINAL ASSEMBLY INCORPORATING THE SAME

[75] Inventors: Bernard Bechaz, Calluire; Luc Doutaz, Oullins; Ariel Ruiz, Villeurbanne, all of France

[73] Assignee: Entrelec S.A., Cedex, France

[21] Appl. No.: 819,006

[22] Filed: Mar. 17, 1997

[30] Foreign Application Priority Data

Mar. 18, 1996 [FR] France .................................. 96 03339

[51] Int. Cl.⁶ ...................................................... H01R 9/26
[52] U.S. Cl. ............................................ 439/716; 439/532
[58] Field of Search .................................... 361/728, 729, 361/735; 439/341, 395, 404, 532, 715, 716, 717, 725, 727

[56] References Cited

U.S. PATENT DOCUMENTS

| | | | |
|---|---|---|---|
| 4,790,770 | 12/1988 | Klaiber | 439/395 |
| 5,249,979 | 10/1993 | Deinhardt et al. | 439/341 |
| 5,299,957 | 4/1994 | Schaeffer | 439/712 |

FOREIGN PATENT DOCUMENTS

| | | |
|---|---|---|
| 0265321A1 | 4/1988 | European Pat. Off. . |
| 0697749A1 | 2/1996 | European Pat. Off. . |
| 2402087A1 | 7/1975 | Germany . |

Primary Examiner—Khiem Nguyen
Attorney, Agent, or Firm—Sughrue, Mion, Zinn, Macpeak & Seas, PLLC

[57] ABSTRACT

A link connection and/or disconnection accessory for a terminal module and for a row of terminal modules for links of a terminal assembly in which the modules identically include one or more connection pieces each for at least one link, at least one through opening for a link, and a tool-insertion opening, corresponding insertion openings of the modules being in alignment when the modules containing them are aligned in a row. The accessory is constituted by a "drive" unit including means enabling it to remain secured to at least one module and to be displaced from module to module, and also at least one connection and/or disconnection mechanism enabling it to act via at least one insertion opening of the terminal module on which the drive unit is currently positioned. The invention also relates to terminal assemblies fitted with such an accessory.

10 Claims, 4 Drawing Sheets

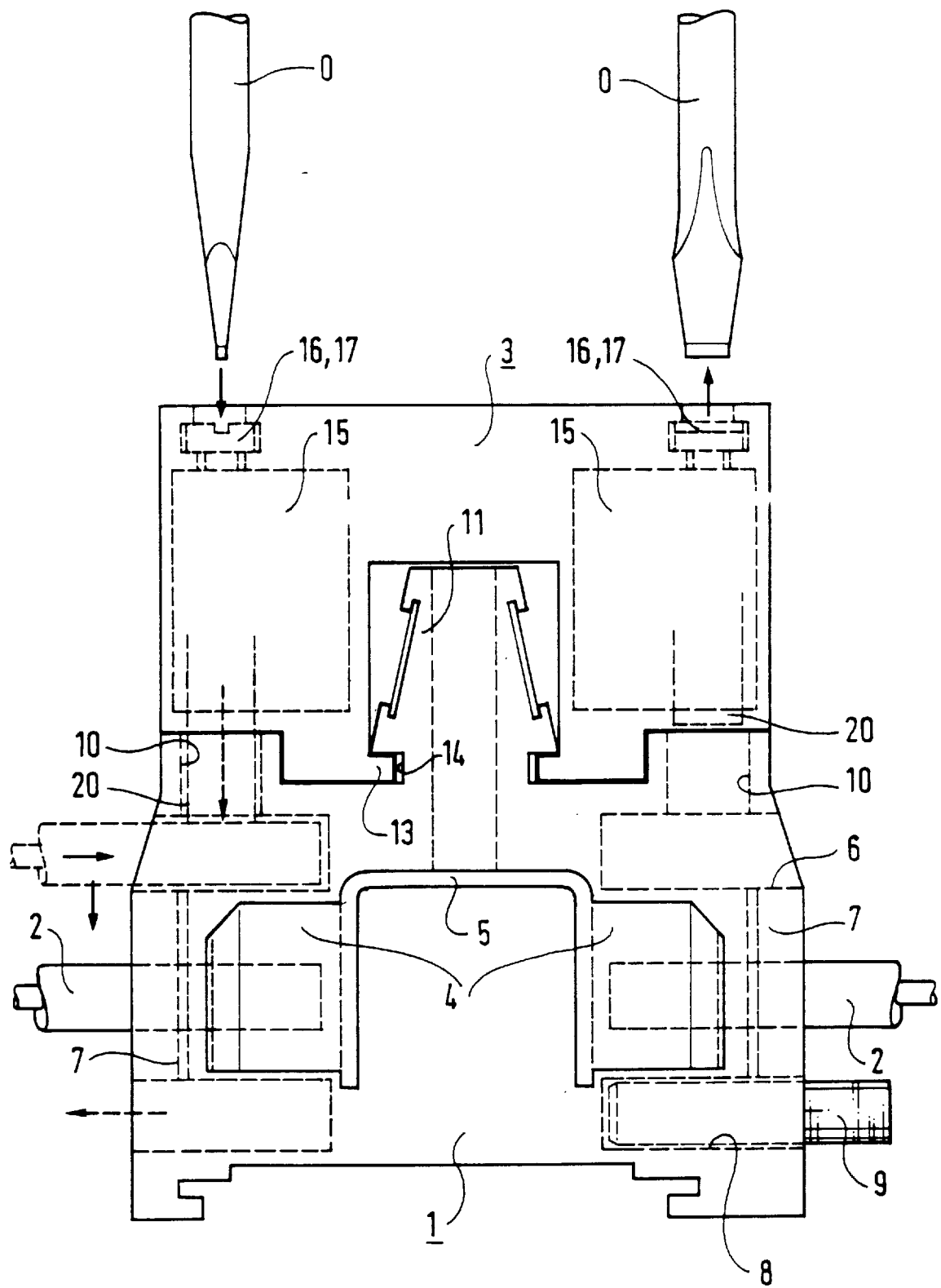

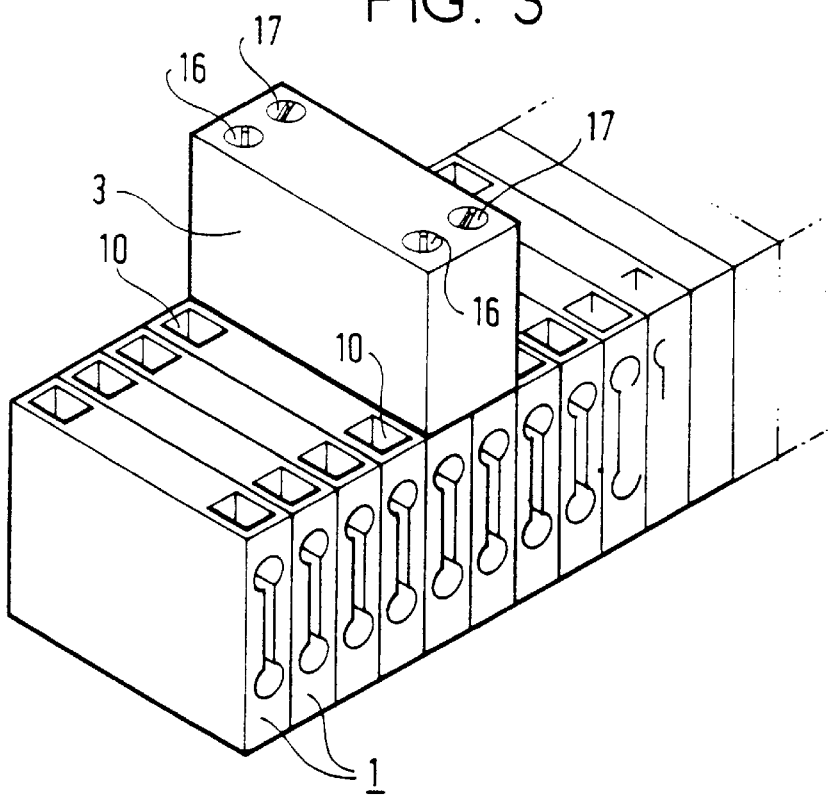
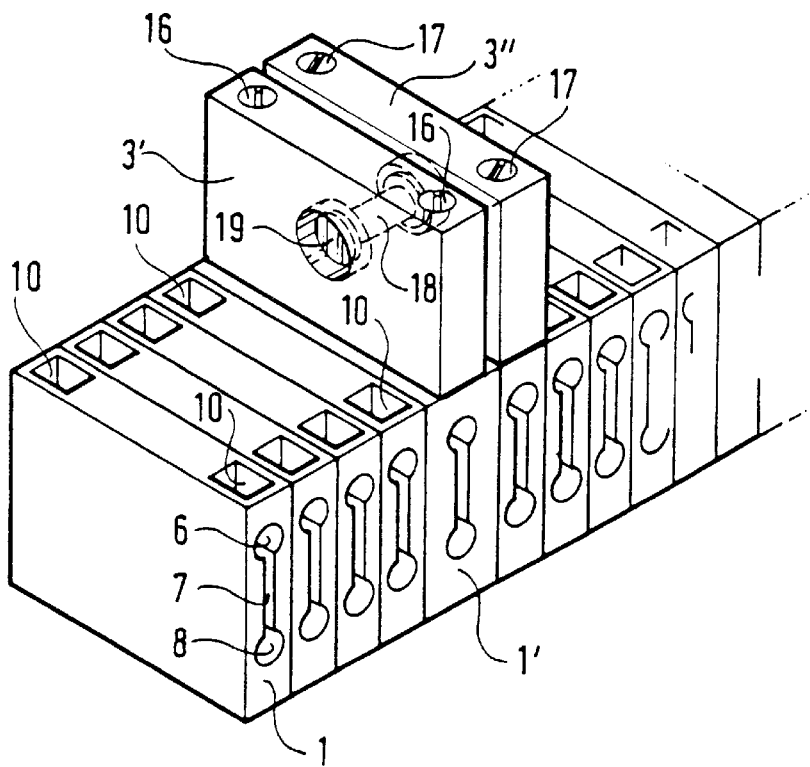
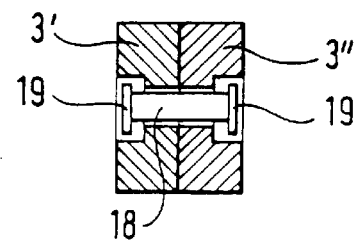
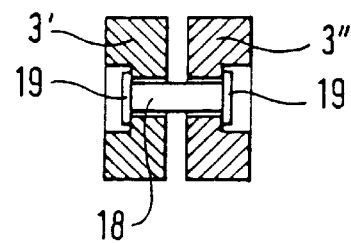

LINK CONNECTION ACCESSORY FOR A TERMINAL MODULE AND A MODULAR TERMINAL ASSEMBLY INCORPORATING THE SAME

The invention relates to a link connection and/or disconnection accessory for a terminal module and for a row of identical or similar terminal modules of a modular terminal assembly for electrical and/or optical links. It also relates to modular terminal assemblies organized to implement such an accessory.

BACKGROUND OF THE INVENTION

As is known, numerous terminal assemblies for electrical or optical links include one or more rows of terminal modules, each suitable for receiving one or more links and designed to be mounted on a support structure which is often housed in a container that is suitable for being closed, such as a box or a cabinet.

The rows of such terminal assemblies often include groups of modules that are identical or similar, in which each module is provided with one or more connection pieces each suitable for connection to at least one electrical or optical link. There exist numerous series of modules that are designed to enable such rows to be made up, and this applies in particular to the series constituted by electrical terminal modules commonly referred to as "junction blocks", an example of which can be found in French patent No. 2 357 080.

Such modules, and in particular such blocks, assumed to belong to series that are made up in identical or similar manner, each include one or more connection pieces suitable for being used in the same way, for example by means of a common special tool, given the identical or similar shapes and positions of the connection pieces in the modules of a given series or of mutually-compatible series.

This leads, in particular, to the positioning of at least some of the penetration openings provided for the links and/or to at least a portion of a tool necessary for connecting such links to the connection pieces being made in the same manner on all modules in a given series or in compatible series. The identically positioned openings in identical or compatible modules suitable for being grouped together in a row are then in alignment when the modules are themselves similarly disposed in a row.

As is known, such rows are usually made by mounting modules on a common support bar, and this applies in particular to those modules which are known as junction blocks and which are described in the above-mentioned French patent.

When the openings for receiving connection tools in the modules of a row are identical and are disposed identically along the row, it can be advantageous to use a specialized connection tool, e.g. of the kind disclosed in European patent 0 265 321. That tool is designed to be used with special blocks in which the connection pieces are housed in cases and include slots for displacing the insulation and for retaining the cores of electrically-conductive wires to be connected. The cases include penetration openings through which the tool is capable of temporarily passing and making engagement. Each such opening allows the moving blade of the tool to penetrate, which blade slides along a slot so as to push the core at one end of a wire that is to be connected along the slot after said core has been appropriately positioned relative to a mouth at one end of the slot.

The connection tool is designed to be engaged with a block only during a connection operation, otherwise it is completely independent, thereby enabling it to be used with other blocks that are identical or that are functionally compatible. Nevertheless, such independence suffers from the drawback that the tool is not necessarily available to personnel who need to take action on a given row of blocks when such action is necessary, particularly when action is taken on blocks that have been installed for some time. There is then a risk that disconnection and/or connection operations will be performed on the blocks by using tools that are unsuitable, and consequently liable to damage the connection pieces concerned and the connections made thereby.

A known solution for mitigating that drawback consists in providing connection blocks each containing an integral connection mechanism enabling connections to be made with links external to the block in question via the connection pieces contained in the block. The mechanism can be driven by means of a common tool, e.g. a screwdriver, for example by rotating the screwdriver while it is engaged in a drive head of the mechanism. The mechanism is generally designed at least to limit the effects of operations performed poorly by a person acting with a screwdriver in the example under consideration, or with any other tool that could be operated in similar manner. Nevertheless, that solution is considered as being relatively expensive insofar as it requires a drive mechanism for each module such as a junction block as envisaged above.

OBJECTS AND SUMMARY OF THE INVENTION

The invention therefore proposes a link connection and/or disconnection accessory for a terminal module and/or a row of identical or similar modules for connection of electrical and/or optical links in a terminal assembly in which said identical or similar modules identically include one or more connection pieces, each for at least one link, at least one through opening for a link, and an "insertion" opening for at least a portion of a tool designed to perform connection and/or disconnection between a link and a connection piece, the corresponding insertion openings of the modules being in alignment when the modules that include them are themselves aligned in a row. According to a characteristic of the invention, the accessory is itself constituted by a "drive" unit including means enabling it to be secured to and to remain secured to at least one terminal module and to be displaced from module to module of a row of terminal modules that are at least sufficiently identical to enable such displacement to be performed, together with at least one connection and/or disconnection mechanism enabling it to act via a portion of a tool, such as a blade, on at least one connection piece via at least one insertion opening of the module containing said connection piece, on which the drive unit is then positioned and to which it is then secured.

BRIEF DESCRIPTION OF THE DRAWINGS

The invention, its characteristics, and its advantages are described in greater detail below with reference to the following figures, in which:

FIG. 2 is a diagrammatic view of a module of the connection assembly fitted with a connection and/or disconnection accessory of the invention;

FIG. 3 is a diagram showing an embodiment of an accessory of the invention;

FIGS. 4A, 4B, and 4C are diagrams relating to a variant embodiment of the accessory of the invention.

MORE DETAILED DESCRIPTION

Figure 1:
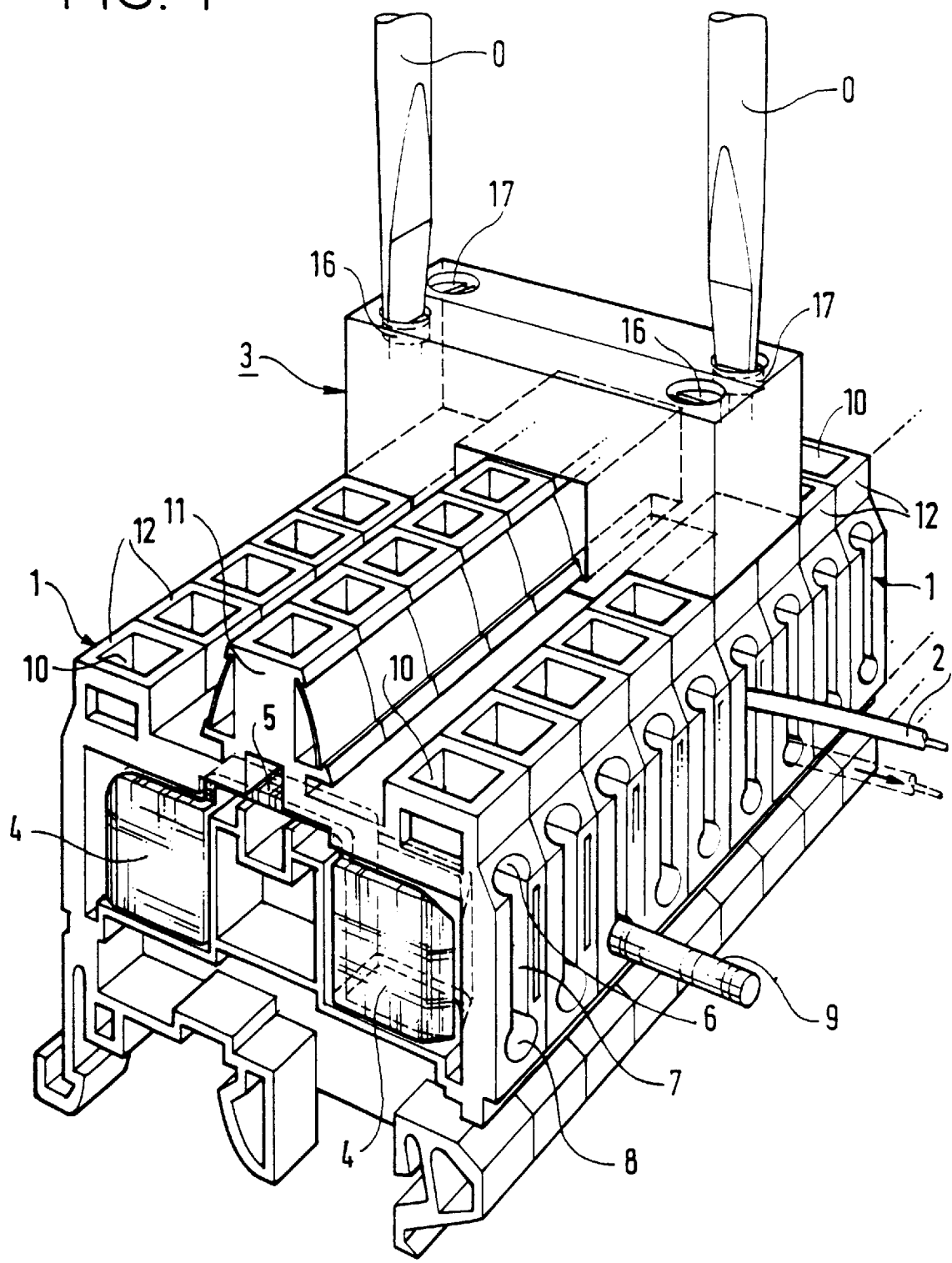
FIG. 1 is a perspective view of an example of a connection assembly fitted with a connection and/or disconnection accessory of the invention.

The terminal assembly shown in FIG. 1 is assumed to comprise a plurality of modules 1 each suitable for connection to at least one electrical and/or optical link 2, together with a "drive" unit 3 serving as a link connection and/or disconnection accessory. By way of example, the modules are electrical junction blocks of the kind described in European patent No. 0 265 321, and they are assumed to be disposed side by side in a row on a common support, e.g. a common bar (not shown) in an assembly that is commonplace in this field.

Each module 1 includes at least one connection piece 4 for at least one link 2. In the example shown in FIG. 1, the connection pieces 4 are designed to receive links of the type comprising an electrically conductive wire in an insulating sheath. Each connection piece includes a rectilinear slot for displacing the insulation and for retaining the core of the wire as described in the above-mentioned French patent. The connection pieces shown in that patent are made by stamping and folding a sheet metal blank, said operations causing pieces to be formed each including a shaped portion of hollow polygonal cross section corresponding approximately to a U-shape in which the free ends have been tilted towards each other. Two end lips corresponding to the obliquely folded free ends are thus obtained for each connection piece, defining respective slots for displacing the insulation and for retaining wire, in the manner mentioned above, each provided with an insulation-displacement mouth at one of two ends by virtue of the lips being cut out symmetrically. In conventional manner, the shaped portion is suitable for being connected to any electrical device, and in particular to an identical shaped portion of another connection piece by means of a common link bar 5 as shown in FIGS. 1 and 2.

Each connection piece 4 is held in a housing designed to receive it in an insulating case specific to the module 1 under consideration, with the insulation-displacement slot being disposed facing an opening through which a wire of appropriate dimensions penetrates into the insulating case. Under such circumstances, the wire-passing opening comprises a first orifice 6 of conical appearance enabling a link 2, i.e. a conductor wire in an insulating sheath to be inserted prior to making a connection, in such a manner as to overlie the mouth of a slot for displacing the insulation and for retaining the wire. The orifice 6 communicates with a slot 7 having resilient lips belonging to the opening in question and extending parallel to the insulation-displacement and retaining slot and designed to retain a conductor wire by engaging its insulating sheath once the wire has been pushed transversely simultaneously along the slot 7 and along the corresponding insulation-displacement and retaining slot. This can be done, for example, by means of the blade of an appropriate connection tool, e.g. a tool as described in European patent No. 0 265 321. A second orifice 8 is provided at the bottom of the slot 7, opening out beyond the insulation-displacement and retaining slot of the connection piece under consideration and designed to enable a wire to be withdrawn after it has been disconnected by being pushed on out from the slot in which it was previously held by means of a blade of the appropriate disconnection tool.

In the embodiment described, the second orifice 8 can be plugged by a removable peg 9 that closes the bottom of the insulation-displacement and retaining slot and also the bottom of the slot 7, thus preventing the above-mentioned wire being withdrawn so long as the peg 9 is in place.

In the embodiment shown in FIG. 1, a "tool insertion" opening 10 is provided specific to each module in line with the hollow shaped portion of each connection piece 4 so as to enable a portion of a connection tool to penetrate therein, which portion of the tool may be of the blade kind (given reference 20 herein) and is then suitable for sliding along the insulation-displacement and retaining slot of said piece and along the slot 7 that is parallel thereto. An example of a connection tool blade 20 of this kind is disclosed in particular in above-mentioned European patent No. 0 265 321.

The openings 10 in each of the modules 1 shown in FIG. 1 are provided in pairs on either side of a central element 11 of the module serving as a support for an element that identifies the module containing it and optionally a chimney for a duct leading to the inside of the module, as is conventional in this field. Each opening 10 is formed in a portion 12 to constitute a chimney for the module corresponding to the opening and in the form of a rectangular parallelepiped.

The portions 12 situated on either side of the central elements 11 in a row of identical or similar modules 1 form two lines of portions situated on respective different sides of the row as defined by the central elements 11.

In the context of the present description, modules are considered as being "similar" when although not identical to a module selected as a reference they nevertheless differ therefrom only in ways that are not significant with respect to how the reference module operates. For example, in the present case, modules are considered as being "similar" if they differ from the reference module only by one or more characteristics that are of no practical consequence in making connections, e.g. irrelevant dimensional differences.

By using modules that are identical or similar as defined above, it is easier to perform connection and disconnection operations insofar as the same tools and the same methods can be used, as is disclosed in particular by European patent No. 0 265 321.

A row of modules that are identical, or similar as defined above, and more particularly the resulting repeating shapes and possibility of continuity, makes it possible to envisage using a single connection and/or disconnection facility capable of being moved from module to module along a row.

According to the invention, this facility is implemented in the form of a "drive" unit 3 designed to serve as a connection and/or connection accessory and it is in the form of a modular type independent unit that is shaped in part to be complementary to a module 1 in a zone of said unit that enables it to take up a position over a zone of the module into which at least one of the tool-insertion openings 10 opens out. This can be seen in particular in FIG. 2 which shows a drive unit 3 acting as a connection and/or disconnection accessory which is mounted on the portion of a module 1 that contains the chimneys 12 in which the tool-insertion openings 10 are formed, and also the central element 11 of the module. The base of the module 1 remote from the above-mentioned portion is shaped to co-operate with a removable piece for fixing the module to a support, as is conventional in this field.

In the example shown in FIG. 2, the drive unit 3 is designed to be capable of remaining secured to the module 1 on which it is mounted because it includes hook-type clip means 13 that co-operate with complementary groove-shaped means 14 formed on the module on either side of the base of the central element 11 of the module. The drive unit 13 can be slid from module to module along a row of modules 1 providing the shapes of the modules along the row are continuously or substantially continuous in the zone along which the drive unit 3 is to slide, as is indeed the case in the example shown in FIG. 1.

Numerous variant embodiments of the drive unit 3 and of the modules 1 can be implemented to satisfy various requirements, and in particular it is easy from the above example to derive sliding variants of the drive unit 3 capable of serving one or more tool-insertion openings 11 per module. It is also possible to envisage reversing the positions of the means 13 and 14 on the drive unit 3 and the modules 1 in order to obtain a similar result.

It is also possible to provide for a drive unit 3 and modules for which the means 13 and 14 are more or less completely replaced by means providing locking and combining at least two fastening devices at least one of which is of the pivoting lever type, for example. By way of example, the lever may be secured to the drive unit and may engage resiliently via one end with complementary relief, e.g. in a lateral groove or recess of the module when the module and the drive unit are coupled together. The lever can be unlocked by taking manual action. Such an organization corresponds, for example, to that described for providing clipping between complementary connector modules in French patent 2 631 749, thereby enabling the drive unit to be moved from module to module along a terminal assembly while ensuring that it is held securely to the module on which it has been placed most recently. The drive unit may optionally be displaced by sliding from module to module along a row, but it can also be displaced by disconnecting the drive unit from the module that is carrying it e.g. in one row, and by replacing the drive unit on another module, possibly belonging to a different row.

In accordance with the invention, the drive unit 3 includes at least one connection and/or disconnection mechanism 15 enabling it to act by means of a tool on at least one connection piece 4 via at least one tool-insertion opening 10 of the module containing said connection piece and on which the drive unit 3 is currently positioned and clipped.

In an embodiment of the invention, a drive unit 3 may include a mechanism 15 of modular structure. In a preferred embodiment, different modules are provided for connection and for disconnection, which modules may either be grouped together in a single container as shown in FIG. 3, or they may be housed in two separate containers as referenced 3' and 3" in FIGS. 4A to 4C.

The, or each, module constituting the mechanism 15 may include, for example, one or more facilities of the same kind as the connection/disconnection facility which operates by means of a screw-actuated pusher as described in French patent application No. 2 723 474, the description of which is included in the present application by reference.

In such a facility, a portion of the tool constituted in this case by a blade 20 of a pusher mounted to slide in a case is suitable for being displaced by means of a drive screw which, when screwed into the pusher, is otherwise prevented from moving in translation relative to the case. Rotating the head of the screw by means of a screwdriver type tool such as 0 causes the pusher to slide in one direction or the other depending on the selected direction of rotation. When the blade is moved along the insulation-displacement and retaining slot of a connection piece 4 from the mouth thereof towards the other end of said slot and along the corresponding slot 7, it serves to push the link that is to be connected along said slots.

Thus, by installing facilities of this kind in the drive unit 3 for each of the tool-insertion openings provided in a module 1 with which the drive unit 3 is suitable for co-operating, it is possible to perform operations of connecting links to all of the connection pieces 4 associated with the openings 10 for receiving a portion of a tool such as a pusher blade as mentioned above.

For reasons of safety and convenience in use, functionally identical facilities may be implemented that differ from one another, e.g. in the sliding stroke that is mechanically available for the blade 20 so as to have longer stroke modules for disconnection purposes and shorter stroke modules for connection purposes when using connection pieces 4 of the type described above. A device for preventing untimely return can be incorporated in the connection modules to prevent making connections in which the link in question is not pushed far enough along the two slots that receive it.

This can be seen in particular in conventional manner by preventing the blade 20 of the tool from returning before it has passed a threshold along the stroke that the blade can have.

FIG. 3 is a diagram of a drive unit 3 for being associated with a row of modules 1 each comprising two connection pieces 4 each having a corresponding tool-insertion opening 10. The drive unit 3 has two connection modules in the facility mentioned above, with only the respective drive screws 16 being visible, and two disconnection modules in the same facility but having a longer blade stroke and with only the two respective drive screws 17 being visible. The drive unit 3 under consideration corresponds dimensionally to two terminal modules on which it is positioned, with its own connection modules overlying one of the two terminal modules and its own disconnection modules overlying the other.

In the variant embodiment shown in FIGS. 4A, 4B, and 4C, and already mentioned above, the connection/disconnection mechanism of a drive unit 3 can also be distributed over two separate elements such as 3' and 3", one containing modules for connection purposes and the other modules for disconnection purposes. Additional link means, represented in this case by a rod 18 having stops 19 at its ends can enable these elements to slide to a limited extent relative to each other along a row of terminal modules. Varying the spacing between the elements 3' and 3" of a single drive unit, as shown in FIGS. 4B and 4C, makes it possible to accommodate possible variations in pitch due to the presence of modules within a single piece of equipment that are similar, such as 1 and 1', e.g. modules that can be aligned in a row with respect to the zone over which the drive unit moves, but which are of different widths insofar as they are designed to receive conductors of section greater than those which the reference modules are designed to receive.

Figure 5:
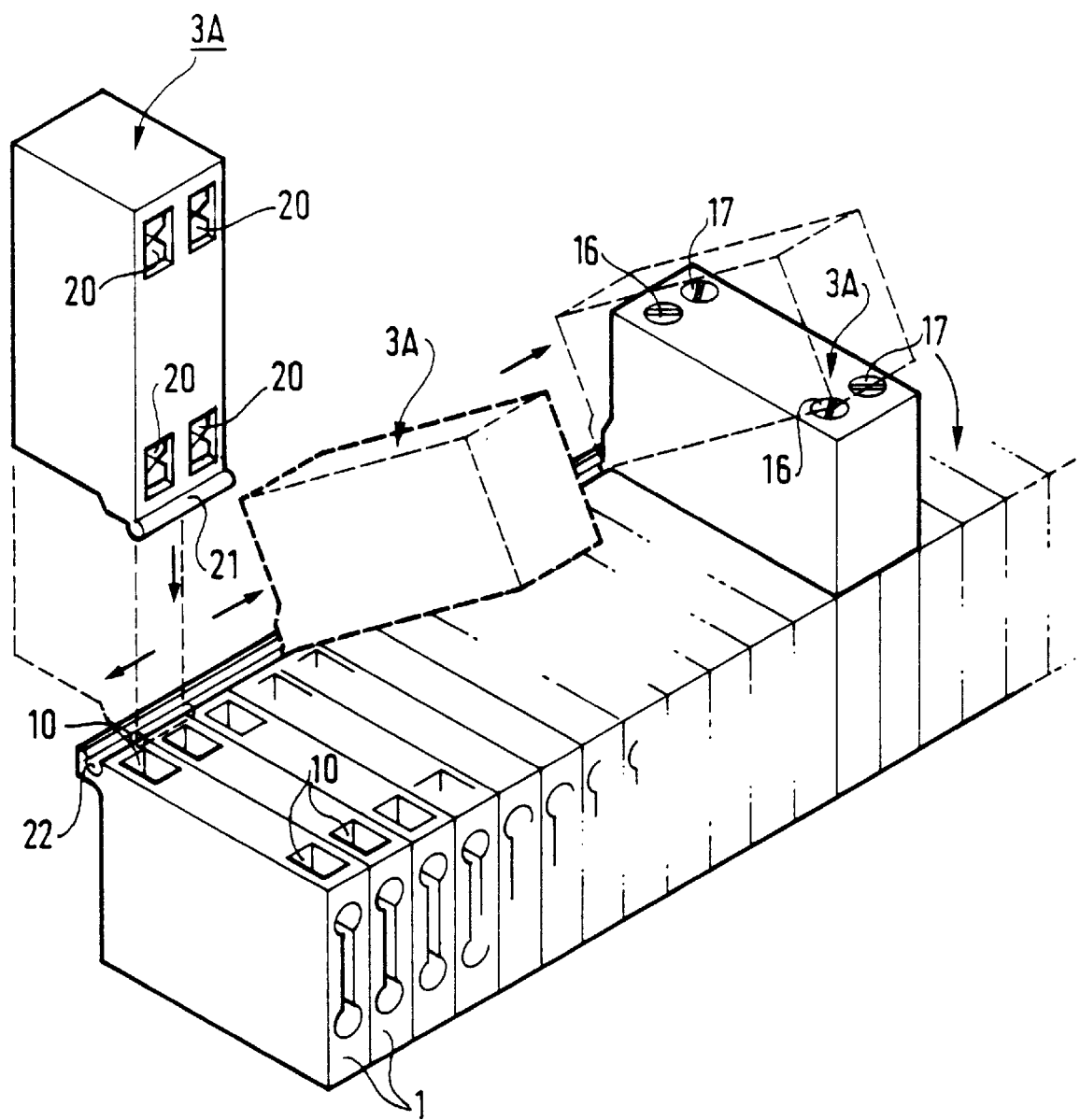
FIG. 5 is another diagram relating to a second variant embodiment of the accessory of the invention.

In another embodiment shown diagrammatically in FIG. 5, and as already mentioned above, the drive unit, now referenced 3A, is suitable for being provided with lockable clip means e.g. combining fixed hooking means 21 for co-operating with complementary means 22 carried by the modules so as to form a hinge along one side of the modules, and pivoting lever type hooking means hinged to the units remote from the hinge. The locking means are manually engaged in unlockable manner to fix complementary means carried by the modules once the drive unit has been hinged down onto the modules by being rotated about the hinge, as shown symbolically in FIG. 5.

As mentioned above, such a drive unit remains secured to the last module on which it has been placed unless it is unlocked manually, and it is also suitable for being slid from module to module along a row by adapting the means used in application of techniques well known to the person skilled in the art.

Finally, the positioning of a drive unit 3 on one or more adjacent modules can have the drawback of hiding, at least in part, the visible markings conventionally carried by the central element 11 of a module. Consequently, means are provided in the drive unit to allow said markings to be read in spite of being overlaid by the drive unit. In one embodiment, at least one inspection duct is provided enabling a marking to be read through the drive unit when the drive unit is in the connection and/or disconnection position relative to a module.

In conventional manner, such a duct (not shown) can either be used for direct viewing, possibly through transparent material that may possibly constitute all or part of the casing of the drive unit, or else indirect viewing implying the use of a reflector used in application of techniques that are well known.

We claim:

1. A link connection and/or disconnection accessory for a terminal module and/or a row of similar modules for connection of electrical and/or optical links in a terminal assembly in which said similar modules each include one or more connection pieces, each for at least one link, at least one through opening for a link, and an "insertion" opening for at least a portion of a tool designed to perform connection and/or disconnection between a link and a connection piece, the corresponding insertion openings of the modules being in alignment when the modules that include them are themselves aligned in a row, the accessory being itself constituted by a "drive" unit including means enabling it to be secured to and to remain secured to at least one terminal module and to be displaced from module to module of a row of terminal modules that are at least sufficiently similar to enable such displacement to be performed, together with at least one connection and/or disconnection mechanism enabling it to act via a portion of a tool, such as a blade, on at least one connection piece via at least one insertion opening of the module containing said connection piece, on which the drive unit is then positioned and to which it is then secured.

2. A connection and/or disconnection accessory according to claim 1, including a modular type drive unit that is partially complementary in shape to a terminal module in a zone of said unit enabling it to be positioned on a zone of the terminal module into which there opens out at least one tool-insertion opening.

3. A connection and/or disconnection accessory according to claim 1, including a drive unit provided with clip means designed to co-operate with complementary means provided on each connection module.

4. A connection and/or disconnection accessory according to claim 3, including a drive unit provided with clip means enabling it to slide along a row of terminal modules for which it is secured via at least one of the modules on which it is currently positioned.

5. A connection and/or disconnection accessory according to claim 3, including a drive unit provided with lockable clip means enabling it to be secured with at least one terminal module, in particular in a row that includes said terminal module.

6. A connection and/or disconnection accessory according to claim 4, including a drive unit provided with lockable clip means enabling it to be secured with at least one terminal module, in particular in a row that includes said terminal module, and including a drive unit provided with clip means enabling it to be secured to at least one terminal module in an alignment and to slide along said alignment.

7. A connection and/or disconnection accessory according to claim 1, including a drive unit made up of two elements each including a portion of the connection and/or disconnection mechanism, and means enabling them to slide in limited manner relative to each other along a row of terminal modules.

8. A connection and/or disconnection accessory according to claim 1 for a row of terminal modules in which each module includes an individual visible marking situated in the vicinity of at least one tool-insertion opening and liable to be covered by the drive unit constituting said accessory, when said unit is in position on the module in question, wherein said drive unit includes means enabling the individual visible marking it covers to be read.

9. A terminal assembly including at least one row of similar terminal modules for electrical and/or optical links, the modules each including one or more connection pieces each for at least one link, at least one through opening for a link, and an "insertion" opening for a tool provided for providing connection and/or disconnection between a link and a connection piece, the corresponding insertion openings of the modules being in alignment when the modules that include them are themselves in alignment in a row, the assembly including means enabling a "drive" unit serving as a connection accessory to be secured to and remain secured to at least one module of a row and to be displaced from module to module, the modules being sufficiently similar to make such displacement possible, said drive unit which is provided with means to enable it to be secured and remain secured to a module further including at least one connection and/or disconnection mechanism enabling it to act by means of a portion of a tool on at least one connection piece via at least one insertion opening of the module containing said piece on which the drive unit is then positioned and to which it is then secured, at least indirectly.

10. A terminal assembly according to claim 9, including a connection and/or disconnection accessory according to claim 1.

* * * * *